United States Patent
Derrenberger et al.

(10) Patent No.: US 7,493,640 B1
(45) Date of Patent: Feb. 17, 2009

(54) ADVERTISEMENT AND TRACKING IN A TELEVISION APPARATUS

(75) Inventors: Mike Arthur Derrenberger, Fishers, IN (US); John Frederick Teskey, Indianapolis, IN (US); Thomas Herman Hamilton, Indianapolis, IN (US); Steven Charles Rhoads, Carmel, IN (US); Michael Eugene Willcox, Knightstown, IN (US); Hugh Boyd Morrison, Seattle, WA (US); Robert Joseph Logan, Indianapolis, IN (US); Jill Suzanne Allen, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 527 days.

(21) Appl. No.: 09/959,140

(22) PCT Filed: Apr. 28, 2000

(86) PCT No.: PCT/US00/11381

§ 371 (c)(1),
(2), (4) Date: Oct. 17, 2001

(87) PCT Pub. No.: WO00/67474

PCT Pub. Date: Nov. 9, 2000

Related U.S. Application Data (60) Provisional application No. 60/186,465, filed on Mar. 2, 2000, provisional application No. 60/131,886, filed on Apr. 30, 1999.

(51) Int. Cl.
*G06F 3/00* (2006.01)
(52) U.S. Cl. ........................................... 725/42; 725/39
(58) Field of Classification Search ............. 725/39–40, 725/42
See application file for complete search history.

(56) References Cited

U.S. PATENT DOCUMENTS

| | | | | |
|---|---|---|---|---|
| 5,223,924 A | * | 6/1993 | Strubbe ....................... | 725/46 |
| 5,233,423 A | | 8/1993 | Jernigan et al. ............. | 358/181 |
| 5,325,183 A | * | 6/1994 | Rhee ........................... | 348/578 |
| 5,353,121 A | * | 10/1994 | Young et al. .................. | 725/52 |
| 6,177,931 B1 | * | 1/2001 | Alexander et al. ............ | 725/52 |
| 2005/0076359 A1 | * | 4/2005 | Pierson et al. ................ | 725/32 |

FOREIGN PATENT DOCUMENTS

| | | |
|---|---|---|
| EP | 0424648 | 5/1991 |
| EP | 0447968 | 9/1991 |
| FR | 2726718 | 5/1996 |
| GB | 2264604 | 9/1993 |
| WO | 98/00975 | 1/1998 |
| WO | 98/31114 | 7/1998 |
| WO | 99/04561 | 1/1999 |
| WO | 99/29109 | 6/1999 |
| WO | 99/45702 | 9/1999 |

\* cited by examiner

*Primary Examiner*—Goerge A Bugg
*Assistant Examiner*—Shirley Lu
(74) *Attorney, Agent, or Firm*—Robert D. Shedd; Harvey D. Fried; Joel M. Fogelson (57) ABSTRACT

A system and a method is disclosed which allows both advertisement and program information to be shown on a channel banner, while user changes channel. In another embodiment, an "advertisement channel" is inserted into an active channel list (e.g., scan list), so that when a user is changing channel, a selected ad will be displayed. In yet another embodiment, a method for tracking and collating advertisement display activity in a video system supporting composite display of image data associated with different multimedia functions and advertisements is disclosed.

5 Claims, 9 Drawing Sheets

ADVERTISEMENT AND TRACKING IN A TELEVISION APPARATUS

This application claims the benefit of U.S. provisional application Ser. No. 60/131,886 filed Apr. 30, 1999; U.S. provision application Ser. No. 60/186,465 filed Mar. 2, 2000, which are hereby incorporated herein by reference, and which claims the benefit under 35 U.S.C. § 365 of International Application PCT/US00/11381, filed Apr. 28, 2000, which was published in accordance with PCT Article 21(2) on Nov. 9, 2000 in English.

FIELD OF INVENTION

This invention generally relates to the field of providing effective user interactivity for electronics devices and more particularly, to a system and method for automatically displaying selected advertisements while a user changes the channel on a video apparatus. In addition, advertisements are selected and tracked automatically to increase ad effectiveness.

BACKGROUND OF INVENTION

Electronic devices such as televisions or VCRs require a control system that includes a user interface system. Typically, a user interface system provides information to a user and simplifies use of the device. One example of a user interface is an electronic menuing system in a television system. The menuing system allows a user to easily interact with and control a television system that is becoming more complex.

Electronic Program Guides (EPG) are very useful for providing program information while a consumer is watching TV. These EPGs are generally supported by advertising displayed along with the program information. However, the consumer must access the EPG to see the program information. In some EPGs, such as current DSS receivers, program information is shown in the channel banner, which is seen while changing channels. To force a user to use the EPG (where advertisements are shown) more often, the prior systems have been showing minimum amount of program information in the channel banner, with no advertisement.

WO 99/04661 describes a system which is capable of displaying an advertisement window with an electronic program guide. The system does not show, however, other multimedia functions such as electronic mail or internet being selectable by a user, or that the advertisement window is automatically highlighted to facilitate and encourage the user to select the advertisement in the composite display

SUMMARY OF THE INVENTION

The present inventors recognize that in the future, the channel banner feature may not be economically viable because it takes away from the use of the EPG (where the advertisements are shown), and therefore reducing the number of ad views in the EPG. The present inventors recognize that it is desirable to be able show ads in the channel banner while the consumer is viewing program information at the same time, providing both convenience for the user as well as additional financial benefit for the advertisers and the service providers.

In addition, the present inventors recognize that it may be desirable to insert an advertisement channel (with or without corresponding channel banner description information) onto a channel list of a video apparatus. The way an ad is inserted into the channel surfing list may be dependent on, for example, a user's channel surfing manner.

Also, it is desirable to select the advertisement to be displayed intelligently and to be able to track advertisement display activity in a television receiver to maximize ad effectiveness.

Figure 1:
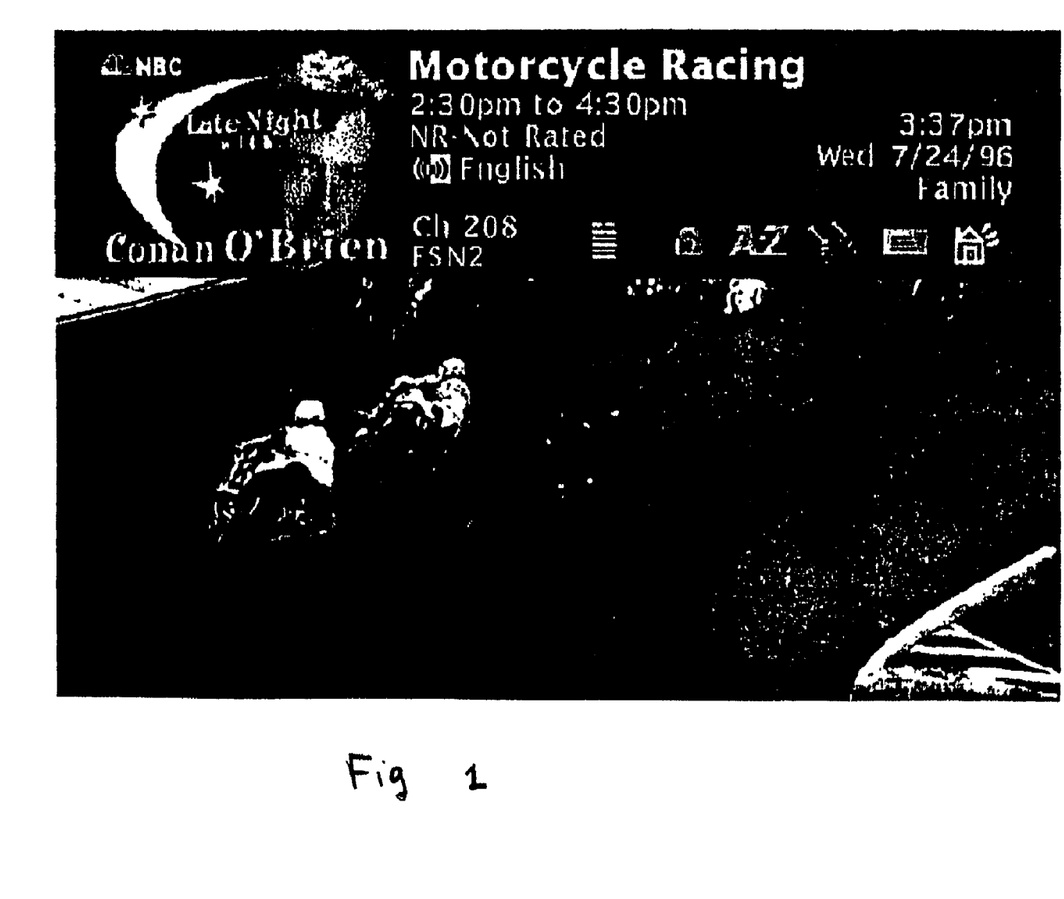
FIG. 1 shows an example of a banner ad and channel banner with program information in accordance with the present invention.

Therefore, a system and a method is disclosed which allows both advertisement and program information to be shown on a channel banner, as shown for example, in FIG. 1. In another embodiment, a channel representing advertisement is inserted into the active channel list (e.g., scan list), so that when a user is channel surfing, a selected ad will be displayed. In yet another embodiment, a method for tracking advertisement display activity in a video decoder system supporting composite display of image data associated with different multimedia functions and advertisements is disclosed, comprising the steps of:

acquiring broadcast video data representing a multimedia function image and video data representing an advertisement image;

generating advertisement display tracking data collating display characteristics of said advertisement image by different multimedia function; and formatting said advertisement display tracking data for output.

DETAILED DESCRIPTION

The present inventors recognize that EPGs deliver two important types of data to a video apparatus: program information, such as title, extended description, rating and genre; and advertisements. To increase effectiveness, it is desirable to coordinate these items to user actions to optimally display an ad. These items would be taken from the data already in the EPG and rearranged to fit the format of the channel banner.

In one embodiment of the invention, as shown in FIG. 1, when the consumer changes channel, the program information changes to reflect what is currently on the channel. At the same time the ad can either remain the same or change. The ad that is shown could be based on the time of day, the channel that is displayed, or the program that is currently on. It could also be changed randomly or according to a predetermined pattern.

This advertising display in the channel banner can be turned on and off by the consumer. Turning it on allows the consumer to see program information while changing the channel, but it will also requires that ads be shown. Turning it off minimizes the size of the channel banner because the ad is not shown, but the program information is not shown either. The choice will be made in the receiving apparatus's menu system. In addition, the ad can be interactive, letting users select it to get more information or to link to more contents such as web content. If the ad is for a program, the consumer can set up a one-touch recording or set their TV to show program when it comes on.

Figure 2:
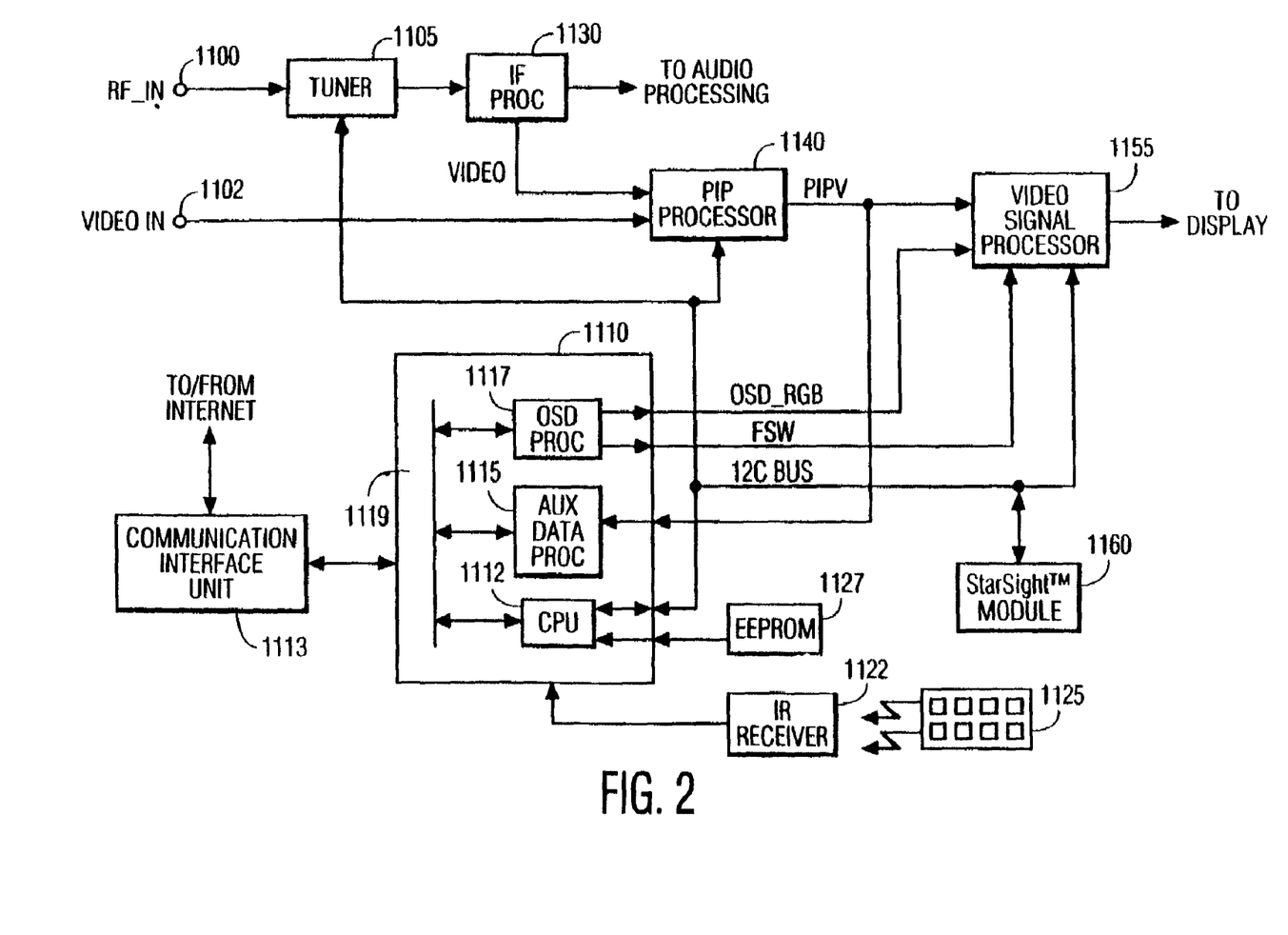
FIG. 2 shows an example of a television system suitable for processing user commands and displaying exemplary user interface screens in accordance to the present invention.

FIG. 2 shows an example of a television system suitable for processing user commands and displaying exemplary user interface screens in accordance with the present invention. The television receiver shown in FIG. 2 is capable of processing both analog NTSC television signals and internet information. The system shown in FIG. 1 has a first input 1100 for receiving television signal RF_IN at RF frequencies and a second input 1102 for receiving baseband television signal VIDEO IN. Signal RF_IN may be supplied from a source such as an antenna or cable system while signal VIDEO IN may be supplied, for example, by a video cassette recorder (VCR). Tuner 1105 and IF processor 1130 operates in a conventional manner for tuning and demodulating a particular television signal that is included in signal RF_IN. IF processor 1130 produces baseband video signal VIDEO representing the video program portion of the tuned television signal. IF processor 1130 also produces a baseband audio signal that is coupled to an audio processing section (not shown in FIG. 1) for further audio processing. Although FIG. 2 shows input 1102 as a baseband signal, the television receiver could include a second tuner and IF processor similar to units 1105 and 1130 for producing a second baseband video signal from either signal RF_IN or from a second RF signal source.

The system shown in FIG. 2 also includes a main microprocessor (mP) 1110 for controlling components of the television receiver such as tuner 1105, picture-in-picture processing unit 1140, video signal processor 1155, and StarSight® data processing module 1160. As used herein, the term "microprocessor" represents various devices including, but not limited to, microprocessors, microcomputers, microcontrollers and controllers. Microprocessor 1110 controls the system by sending and receiving both commands and data via serial data bus I²C BUS that utilizes the well-known I²C serial data bus protocol. More specifically, central processing unit (CPU) 1112 within mP 1110 executes control programs contained within memory, such as EEPROM 1127 shown in FIG. 2, in response to commands provided by a user, e.g., via IR remote control 1125 and IR receiver 1122. For example, activation of a "CHANNEL UP" feature on remote control 1125 causes CPU 1112 to send a "change channel" command along with channel data to tuner 1105 via I²C BUS. As a result, tuner 1105 tunes the next channel in the channel scan list. Another example of a control program stored in EEPROM 1127 is software for implementing the operations shown in FIGS. 6A, 6B, 7 and 8 in flow chart form to be discussed below and in accordance with the present invention.

Main microprocessor 1110 also controls the operation of a communications interface unit 1113 for providing the capability to upload and download information to and from the Internet. Communication interface unit 1113 includes, for example, a modem for connecting to an Internet service provider, e.g., via a telephone line or via a cable television line. The communication capability allows the system shown in FIG. 1 to provide email capability and Internet related features such as web browsing in addition to receiving television programming.

CPU 1112 controls functions included within mP 1110 via bus 1119 within mP 1110. In particular, CPU 1112 controls auxiliary data processor 1115 and on-screen display (OSD) processor 1117. Auxiliary data processor 1115 extracts auxiliary data such as StarSight® data from video signal PIPV.

StarSight® data, which provides program guide data information in a known format, is typically received only on a particular television channel and the television receiver must tune that channel to extract StarSight® data. To prevent StarSight® data extraction from interfering with normal use of the television receiver, CPU 1112 initiates StarSight® data extraction by tuning the particular channel only during a time period when the television receiver is usually not in use (e.g., 2:00 AM). At that time, CPU 1112 configures decoder 1115 such that auxiliary data is extracted from horizontal line intervals such as line 16 that are used for StarSight® data. CPU 1112 controls the transfer of extracted StarSight® data from decoder 1115 via I²C BUS to StarSight® module 1160. A processor internal to the module formats and stores the data in memory within the module. In response to the StarSight® EPG display being activated (e.g., a user activating a particular key on remote control 125), CPU 1112 transfers formatted StarSight® EPG display data from StarSight® module 1160 via I²C BUS to OSD processor 1117.

Figure 5:
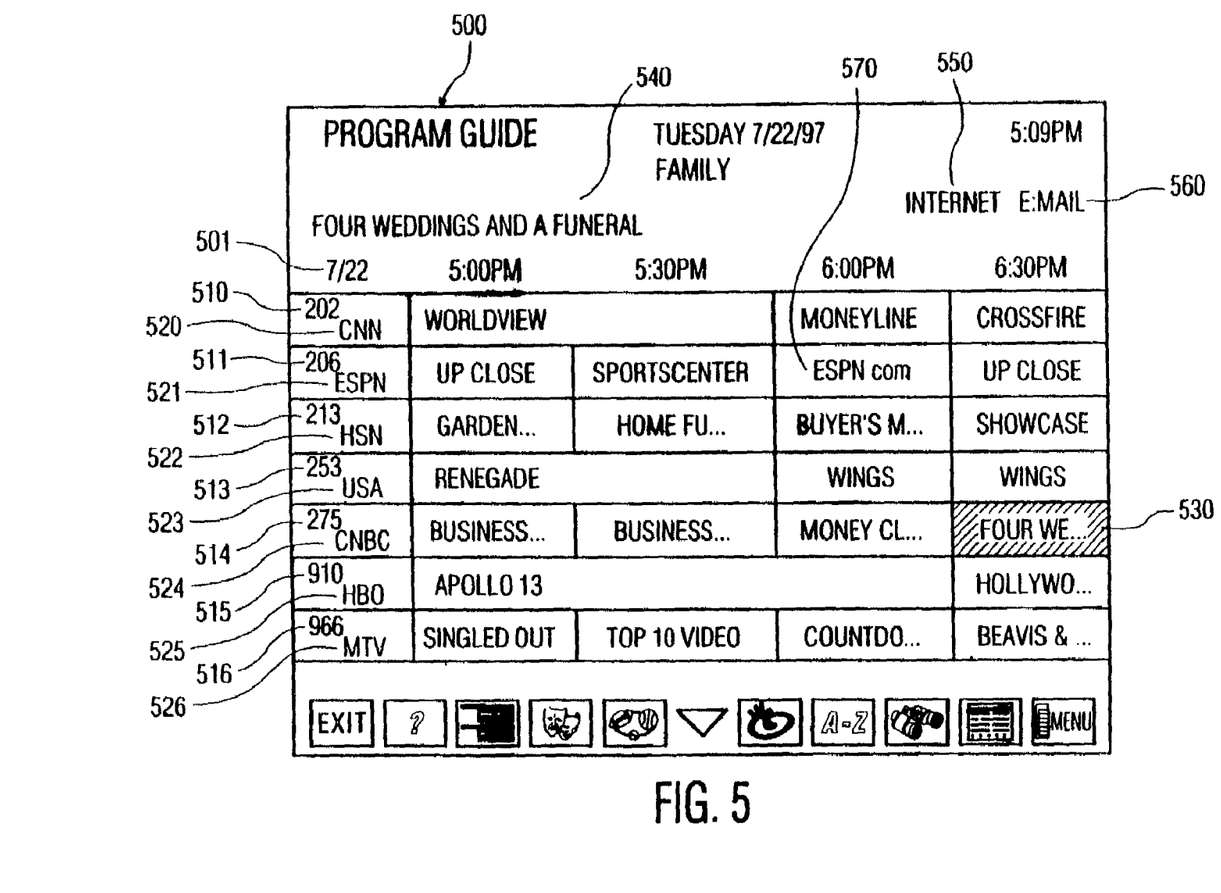
FIG. 5 shows an example of a program guide for selecting programs.

An EPG is an interactive, on-screen display feature that displays information analogous to TV listings found in local newspapers or other print media. In addition, an EPG also includes information necessary for collating and decoding programs. An EPG provides information about each program within the time frames covered by the EPG that typically ranges from the next hour up to seven days. The information contained in an EPG includes programming characteristics such as channel number, program title, start time, end time, elapsed time, time remaining, rating (if available), topic, theme, and a brief description of the program's content. EPGs are usually arranged in a two-dimensional table or grid format with time information on one axis and channel information on the other axis. An example of an program guide is shown in FIG. 5.

Unlike non-interactive guides that reside on a dedicated channel and merely scroll through the current programming on the other channels for the next 2 to 3 hours, EPGs allow viewers to select any channel at any time during some period into the future, e.g., up to seven days forward. Further EPG features include the ability to highlight individual cells of the grid containing program information. Once highlighted, the viewer can perform functions pertaining to that selected program. For instance, the viewer could instantly switch to that program if it is currently being aired. Viewers could also program one touch video cassette recording (VCR) or the like if the television is properly configured and connected to a recording device. Such EPGs are known in the art and described, for instance, in U.S. Pat. Nos. 5,353,121; 5,479,268; and 5,479,266 issued to Young et al. and assigned to StarSight Telecast, Inc.

In addition, U.S. Pat. No. 5,515,106, issued to Chaney et al., and assigned to the same assignee of the present invention, describes in detail an exemplary embodiment including data packet structure necessary to implement an exemplary program guide system. The exemplary data packet structure is designed so that both the channel information (e.g., channel name, call letters, channel number, type, etc.) and the program description information (e.g., content, title, rating, star, etc.) relating to a program may be transmitted from a program guide database provider to a receiving apparatus efficiently.

OSD processor 1117 operates in a conventional manner to produce R, G, and B video signals OSD_RGB that, when coupled to a displayed device (not shown), will produce a displayed image representing on-screen display information in according to flow charts to be shown in FIGS. 6-8 and to be described later. OSD processor 1117 also produces control signal Fast-Switch (FSW) which is intended to control a fast switch for inserting signals OSD_RGB into the system's video output signal at times when an on-screen display is to be displayed. Therefore, when a user enables the various user interface screens of the present invention to be described later, OSD processor 1117 produces the corresponding signals OSD_RGB representing the on-screen display information previously stored or programmed in the memory 1127. For example, when a user enables an EPG, e.g., by activating a particular switch on remote control 1125, CPU 1112 enables processor 1117. In response, processor 1117 produces signals OSD_RGB representing the program guide data information previously extracted and already stored in memory, as discussed above.

Processor 1117 also produces signal FSW indicating when the EPG is to be displayed.

Video signal processor (VSP) 1155 performs conventional video signal processing functions, such as luma and chroma processing. Output signals produced by VSP 1155 are suitable for coupling to a display device, e.g., a kinescope or LCD device (not shown in FIG. 2), for producing a displayed image. VSP 1155 also includes a fast switch for coupling signals produced by OSD processor 1117 to the output video signal path at times when graphics and/or text is to be included in the displayed image. The fast switch is controlled by control signal FSW which is generated by OSD processor 1117 in main microprocessor 1110 at times when text and/or graphics are to be displayed.

The input signal for VSP 1155 is signal PIPV that is output by picture-in-picture (PIP) processor 1140. When a user activates PIP mode, signal PIPV represents a large picture (large pix) into which a small picture (small pix) is inset. When PIP mode is inactive, signal PIPV represents just the large pix, i.e., no small pix signal is included in signal PIPV. PIP processor 1140 provides the described functionality in a conventional manner using features included in unit 1140 such as a video switch, analog-to-digital converter (ADC), RAM, and digital to analog converter (DAC).

As mentioned above, the display data included in the EPG display is produced by OSD processor 1117 and included in the output signal by VSP 1155 in response to fast switch signal FSW. When controller 1110 detects activation of the EPG display, e.g., when a user presses an appropriate key on remote control 1125, controller 1110 causes OSD processor 1117 to produce the EPG display using information such as program guide data from StarSight® module 1160. Controller 1110 causes VSP 1155 to combine the EPG display data from OSD processor 1117 and the video image signal in response to signal FSW to produce a display including EPG. The EPG can occupy all or only a portion of the display area.

When the EPG display is active, controller 1110 executes an EPG control program stored in EEPROM 1127. The control program monitors the location of a position indicator, such as a cursor and/or highlighting, in the EPG display. A user controls the location of the position indicator using direction and selection keys of remote control 1125. Alternatively, the system could include a mouse device. Controller 1110 detects activation of a selection device, such as clicking a mouse button, and evaluates current cursor location information in conjunction with EPG data being displayed to determine the function desired, e.g., tuning a particular program. Controller 1110 subsequently activates the control action associated with the selected feature.

An exemplary embodiment of the features of the system shown in FIG. 2 that have been described thus far comprises an ST9296 microprocessor produced by SGS-Thomson Microelectronics for providing the features associated with mP 1110; an M65616 picture-in-picture processor produced by Mitsubishi for providing the described basic PIP functionality associated with PIP processor 1140; and an LA7612 video signal processor produced by Sanyo for providing the functions of VSP 1155.

Figure 3:
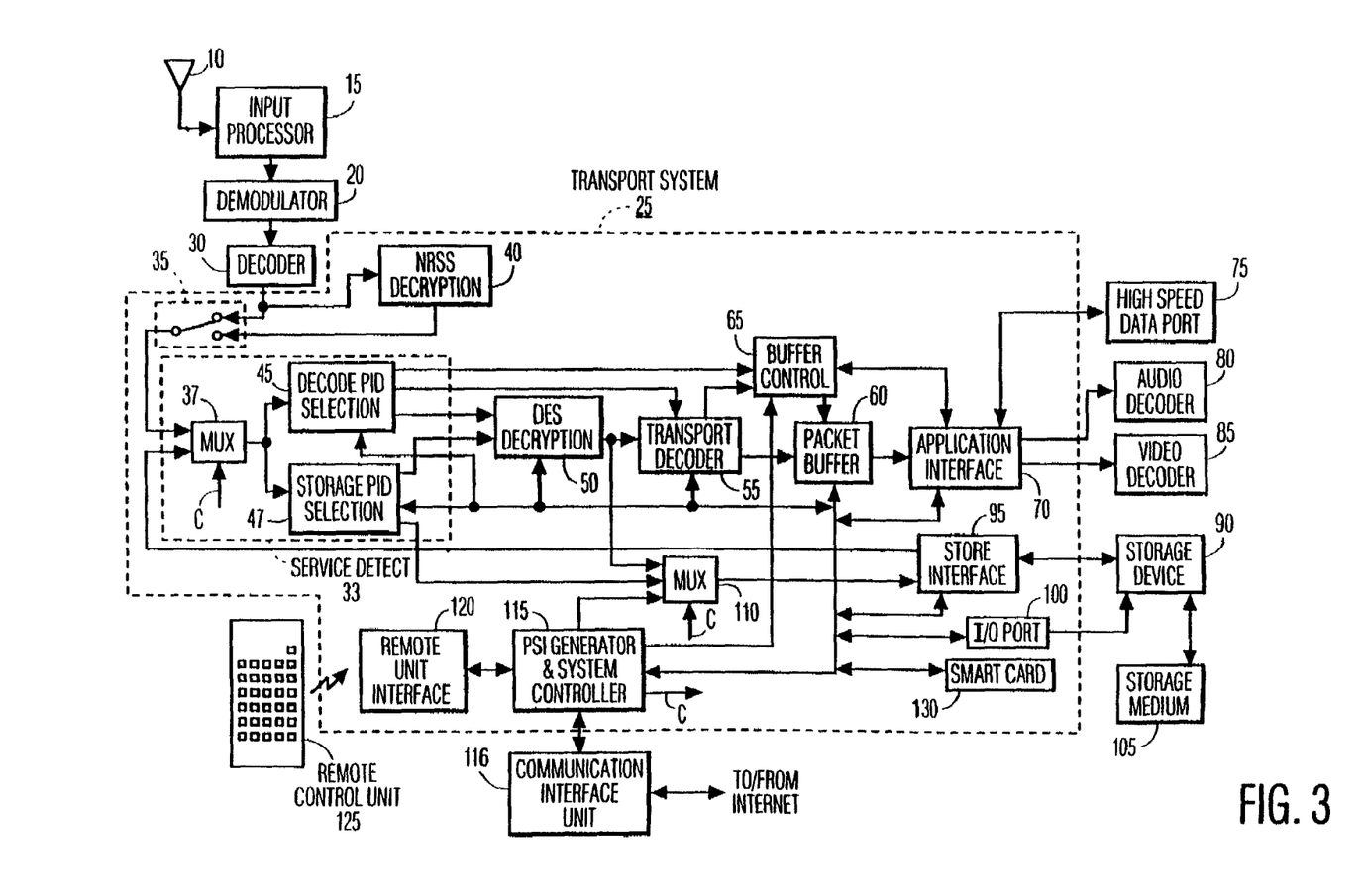
FIG. 3 shows an example of a digital video processing apparatus suitable for processing user commands and displaying exemplary user interface screens in accordance with the present invention.

FIG. 3 shows another example of an electronic device capable of processing user commands and displaying exemplary user interface screens in accordance with the present invention. As described below, the system shown in FIG. 3 is an MPEG compatible system for receiving MPEG encoded transport streams representing broadcast programs. However, the system shown in FIG. 2 is exemplary only. The user interface system described herein is also applicable to other types of digital signal processing devices including non-MPEG compatible systems, involving other types of encoded datastreams. For example, other devices include digital video disc (DVD) systems and MPEG program streams, and systems combining computer and television functions such as the so-called "PCTV". Further, although the system described below is described as processing broadcast programs, this is exemplary only. The term 'program' is used to represent any form of packetized data such as telephone messages, computer programs, Internet data or other communications, for example.

In overview, in the video receiver system of FIG. 3, a carrier modulated with video data is received by antenna 10 and processed by unit 15. The resultant digital output signal is demodulated by demodulator 20 and decoded by decoder 30. The output from decoder 30 is processed by transport system 25 which is responsive to commands from remote control unit 125. System 25 provides compressed data outputs for storage, further decoding, or communication to other devices.

Video and audio decoders 85 and 80 respectively, decode the compressed data from system 25 to provide outputs for display. Data port 75 provides an interface for communication of the compressed data from system 25 to other devices such as a computer or High Definition Television (HDTV) receiver, for example. Storage device 90 stores the compressed data from system 25 on storage medium 105. Device 90, in a playback mode also supports retrieval of the compressed data from storage medium 105 for processing by system 25 for decoding, communication to other devices or storage on a different storage medium (not shown to simplify drawing).

Considering FIG. 3 in detail, a carrier modulated with video data received by antenna 10, is converted to digital form and processed by input processor 15. Processor 15 includes radio frequency (RF) tuner and intermediate frequency (IF)

mixer and amplification stages for down-converting the input video signal to a lower frequency band suitable for further processing. The resultant digital output signal is demodulated by demodulator 20 and decoded by decoder 30. The output from decoder 30 is further processed by transport system 25.

Multiplexer (mux) 37 of service detector 33 is provided, via selector 35, with either the output from decoder 30, or the decoder 30 output further processed by a descrambling unit 40. Descrambling unit 40 may be, for example, a removable unit such as a smart card in accordance with ISO 7816 and NRSS (National Renewable Security Standards) Committee standards (the NRSS removable conditional access system is defined in EIA Draft Document IS-679, Project PN-3639). Selector 35 detects the presence of an insertable, compatible, descrambling card and provides the output of unit 40 to mux 37 only if the card is currently inserted in the video receiver unit. Otherwise selector 35 provides the output from decoder 30 to mux 37. The presence of the insertable card permits unit 40 to descramble additional premium program channels, for example, and provide additional program services to a viewer. It should be noted that in the preferred embodiment NRSS unit 40 and smart card unit 130 (smart card unit 130 is discussed later) share the same system 25 interface such that only either an NRSS card or a smart card may be inserted at any one time. However, the interfaces may also be separate to allow parallel operation.

The data provided to mux 37 from selector 35 is in the form of an MPEG compliant packetized transport datastream as defined in MPEG systems standard section 2.4 and includes program guide information and the data content of one or more program channels. The individual packets that comprise particular program channels are identified by Packet Identifiers (PIDs). The transport stream contains Program Specific Information (PSI) for use in identifying the PIDs and assembling individual data packets to recover the content of all the program channels that comprise the packetized datastream. Transport system 25, under the control of the system controller 115, acquires and collates program guide information from the input transport stream, storage device 90 or an internet service provider via the communication interface unit 116. The individual packets that comprise either particular program channel content or Program Guide information, are identified by their Packet Identifiers (PIDs) contained within header information. As discussed above, the program description contained in the program guide information may comprise different program descriptive fields such as title, star, rating, etc., relating to a program.

The user interface incorporated in the video receiver shown in FIG. 3 enables a user to activate various features by selecting a desired feature from an on-screen display (OSD) menu. The OSD menu may include an electronic program guide (EPG) as described above, and other features discussed below.

Data representing information displayed in the OSD menu is generated by system controller 115 in response to stored on-screen display (OSD) information representing text/graphics, stored program guide information, and/or program guide and text/graphics information received via the input signal as described above and in accordance with exemplary control programs to be shown in FIGS. 6-8, and to be discussed below. The software control programs may be stored, for example, in embedded memory (not shown) of system controller 115.

Using remote control unit 125 (or other selection means such as a mouse) a user can select from the OSD menu items such as a program to be viewed, a program to be stored (e.g., recorded), the type of storage media and manner of storage.

System controller 115 uses the selection information, provided via interface 120, to configure system 25 to select the programs for storage and display and to generate PSI suitable for the selected storage device and media. Controller 115 configures system 25 elements 45, 47, 50, 55, 65 and 95 by setting control register values within these elements via a data bus and by selecting signal paths via muxes 37 and 110 with control signal C.

In response to control signal C, mux 37 selects either, the transport stream from unit 35, or in a playback mode, a datastream retrieved from storage device 90 via store interface 95. In normal, non-playback operation, the data packets comprising the program that the user selected to view are identified by their PIDs by selection unit 45. If an encryption indicator in the header data of the selected program packets indicates the packets are encrypted, unit 45 provides the packets to decryption unit 50. Otherwise unit 45 provides non-encrypted packets to transport decoder 55. Similarly, the data packets comprising the programs that the user selected for storage are identified by their PIDs by selection unit 47. Unit 47 provides encrypted packets to decryption unit 50 or non-encrypted packets to mux 110 based on the packet header encryption indicator information.

The functions of decryptors 40 and 50 may be implemented in a single removable smart card which is compatible with the NRSS standard. The approach places all security related functions in a removable unit that can easily be replaced if a service provider decides to change encryption techniques or to permit easily changing the security system, e.g., to descramble a different service.

Units 45 and 47 employ PID detection filters that match the PIDs of incoming packets provided by mux 37 with PID values pre-loaded in control registers within units 45 and 47 by controller 115. The pre-loaded PIDs are used in units 47 and 45 to identify the data packets that are to be stored and the data packets that are to be decoded for use in providing a video image. The pre-loaded PIDs are stored in look-up tables in units 45 and 47. The PID look-up tables are memory mapped to encryption key tables in units 45 and 47 that associate encryption keys with each pre-loaded PID. The memory mapped PID and encryption key look-up tables permit units 45 and 47 to match encrypted packets containing a pre-loaded PID with associated encryption keys that permit their decryption. Non-encrypted packets do not have associated encryption keys. Units 45 and 47 provide both identified packets and their associated encryption keys to decryptor 50. The PID look-up table in unit 45 is also 206, memory mapped to a destination table that matches packets containing pre-loaded PIDs with corresponding destination buffer locations in packet buffer 60. The encryption keys and destination buffer location addresses associated with the programs selected by a user for viewing or storage are pre-loaded into units 45 and 47 along with the assigned PIDs by controller 115. The encryption keys are generated by ISO 7816-3 compliant smart card system 130 from encryption codes extracted from the input datastream. The generation of the encryption keys is subject to customer entitlement determined from coded information in the input data stream and/or pre-stored on the insertable smart card itself (International Standards Organization document ISO 7816-3 of 1989 defines the interface and signal structures for a smart card system).

The packets provided by units 45 and 47 to unit 50 are encrypted using an encryption technique such as the Data Encryption Standard (DES) defined in Federal Information Standards (FIPS) Publications 46, 74 and 81 provided by the National Technical Information Service, Department of Commerce. Unit 50 decrypts the encrypted packets using corresponding encryption keys provided by units 45 and 47 by applying decryption techniques appropriate for the selected encryption algorithm. The decrypted packets from unit 50 and the non-encrypted packets from unit 45 that comprise the program for display are provided to decoder 55. The decrypted packets from unit 50 and the non-encrypted packets from unit 47 that comprise the program for storage are provided to mux 110.

Unit 60 contains four packet buffers accessible by controller 115. One of the buffers is assigned to hold data destined for use by controller 115 and the other three buffers are assigned to hold packets that are destined for use by application devices 75, 80 and 85. Access to the packets stored in the four buffers within unit 60 by both controller 115 and by application interface 70 is controlled by buffer control unit 65. Unit 45 provides a destination flag to unit 65 for each packet identified by unit 45 for decoding. The flags indicate the individual unit 60 destination locations for the identified packets and are stored by control unit 65 in an internal memory table. Control unit 65 determines a series of read and write pointers associated with packets stored in buffer 60 based on the First-In-First-Out (FIFO) principle. The write pointers in conjunction with the destination flags permit sequential storage of an identified packet from units 45 or 50 in the next empty location within the appropriate destination buffer in unit 60. The read pointers permit sequential reading of packets from the appropriate unit 60 destination buffers by controller 115 and application interface 70.

The non-encrypted and decrypted packets provided by units 45 and 50 to decoder 55 contain a transport header as defined by section 2.4.3.2 of the MPEG systems standard. Decoder 55 determines from the transport header whether the non-encrypted and decrypted packets contain an adaptation field (per the MPEG systems standard). The adaptation field contains timing information including, for example, Program Clock References (PCRs) that permit synchronization and decoding of content packets. Upon detection of a timing information packet, that is a packet containing an adaptation field, decoder 55 signals controller 115, via an interrupt mechanism by setting a system interrupt, that the packet has been received. In addition, decoder 55 changes the timing packet destination flag in unit 65 and provides the packet to unit 60. By changing the unit 65 destination flag, unit 65 diverts the timing information packet provided by decoder 55 to the unit 60 buffer location assigned to hold data for use by controller 115, instead of an application buffer location.

Upon receiving the system interrupt set by decoder 55, controller 115 reads the timing information and PCR value and stores it in internal memory. PCR values of successive timing information packets are used by controller 115 to adjust the system 25 master clock (27 MHz). The difference between PCR based and master clock based estimates of the time interval between the receipt of successive timing packets, generated by controller 115, is used to adjust the system 25 master clock. Controller 115 achieves this by applying the derived time estimate difference to adjust the input control voltage of a voltage controlled oscillator used to generate the master clock. Controller 115 resets the system interrupt after storing the timing information in internal memory.

Packets received by decoder 55 from units 45 and 50 that contain program content including audio, video, caption, and other information, are directed by unit 65 from decoder 55 to the designated application device buffers in packet buffer 60. Application control unit 70 sequentially retrieves the audio, video, caption and other data from the designated buffers in buffer 60 and provides the data to corresponding application devices 75, 80 and 85. The application devices comprise audio and video decoders 80 and 85 and high speed data port 75. For example, packet data corresponding to a composite program guide generated by the controller 115 as described above and as shown in FIG. 5, may be transported to the video decoder 85 for formatting into video signal suitable for display on a monitor (not shown) connected to the video decoder 85. Also, for example, data port 75 may be used to provide high speed data such as computer programs, for example, to a computer. Alternatively, port 75 may be used to output data to an HDTV decoder to display images corresponding to a selected program or a program guide, for example.

Packets that contain PSI information are recognized by unit 45 as destined for the controller 115 buffer in unit 60. The PSI packets are directed to this buffer by unit 65 via units 45, 50 and 55 in a similar manner to that described for packets containing program content. Controller 115 reads the PSI from unit 60 and stores it in internal memory.

Controller 115 also generates condensed PSI (CPSI) from the stored PSI and incorporates the CPSI in a packetized datastream suitable for storage on a selectable storage medium. The packet identification and direction is governed by controller 115 in conjunction with the unit 45 and unit 47 PID, destination and encryption key look-up tables and control unit 65 functions in the manner previously described.

In addition, controller 115 is coupled to a communication interface unit 116 that operates in a manner similar to interface unit 1113 in FIG. 2. That is, unit 116 provides the capability to upload and download information to and from the Internet. Communication interface unit 116 includes, for example, a modem for connecting to an Internet service provider, e.g., via a telephone line or via a cable television line. The communication capability allows the system shown in FIG. 3 to provide email capability and Internet related features such as web browsing in addition to receiving television programming.

Figure 4:
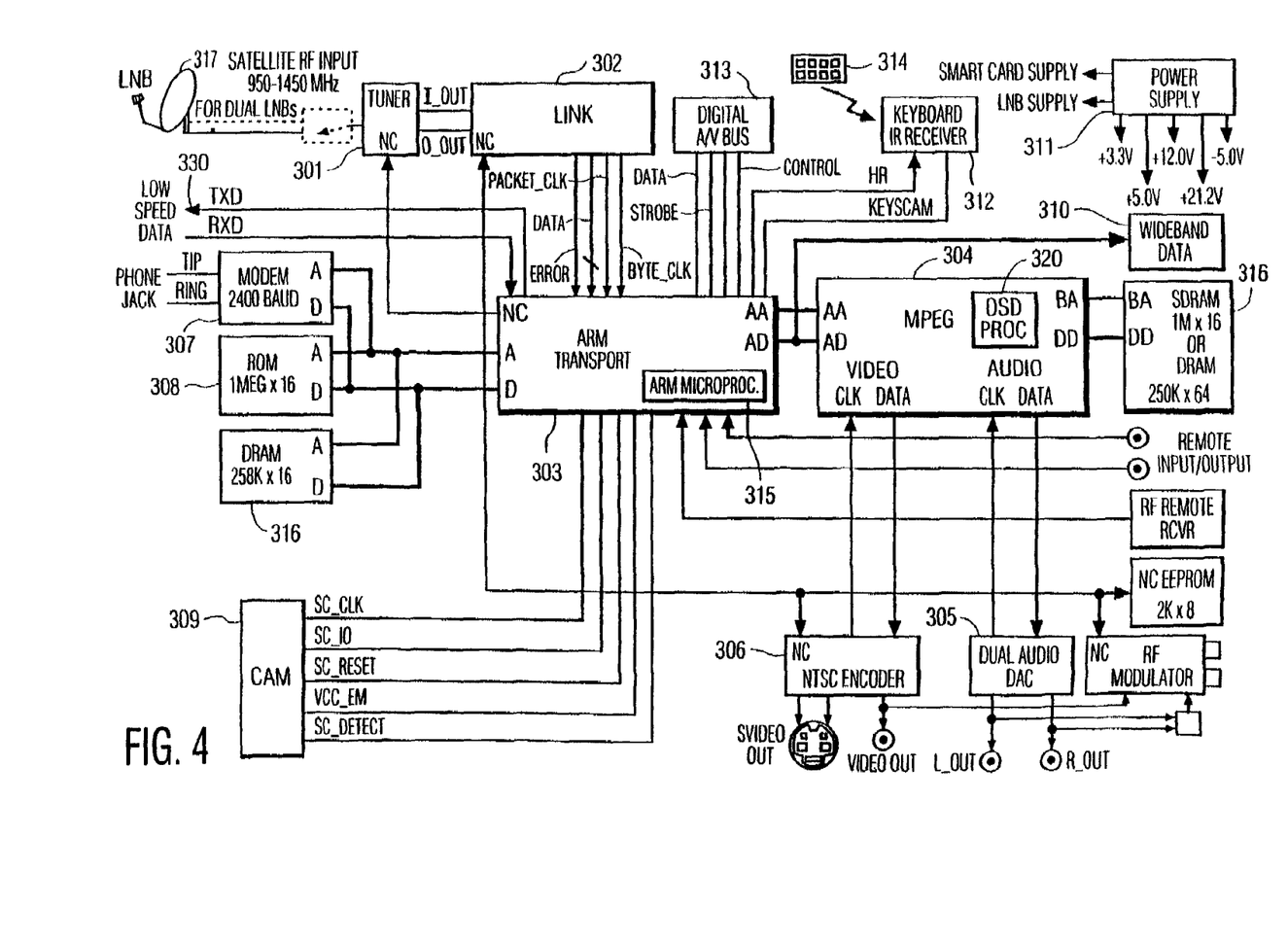
FIG. 4 shows a block diagram of a specific implementation of a digital satellite system suitable for processing user commands and displaying exemplary user interface screens in accordance with the present invention.

FIG. 4 is a specific implementation of an electronic device generally shown in FIG. 3 and described in detail above. FIG. 4 represents a satellite receiver set-top box, designed and manufactured by Thomson Consumer Electronics, of Indianapolis, Ind., USA, for receiving DirecTV™ satellite service provided by Hughes Electronics.

As shown in FIG. 4, the set-top box has a tuner 301 which receives and tunes applicable satellite RF signals in the range of 950-1450 MHz from a satellite antenna 317. The tuned analog signals are outputted to a link module 302 for further processing. Link module 302 is responsible for further processing of the analog tuned signals I_out and Q_out from tuner 301, including filtering and conditioning of the analog signals, and conversion of the analog signals into a digital output signal, DATA. The link module 302 is implemented as an integrated circuit (IC). The link module IC is manufactured by SGS-Thomson Microelectronics of Grenoble, France, and has Part No. ST 15339-610.

The digital output, DATA, from the link module 302 consists of compliant packetized data stream recognized and processable by the transport unit 303. The datastream, as discussed in detail in relation to FIG. 3, includes program guide data information and the data content of one or more program channels of the satellite broadcast service from Direct TV™. As discussed above, program guide data contains information relating to the type of program (e.g., audio-only, video-only, etc.) as indicated, for example, by the "class" type.

The function of the transport unit 303 is the same as the transport system 25 shown in FIG. 3 and discussed already. As described above, the transport unit 303, processes the packetized data stream according to the Packet Identifiers (PID) contained in the header information. The processed data stream is then formatted into MPEG compatible, compressed audio and video packets and coupled to a MPEG decoder 304 for further processing.

The transport unit 303 is controlled by an Advanced RISC Microprocessor (ARM) 315 which is a RISC based microprocessor. The ARM processor 315 executes control software residing in ROM 308. Exemplary components of the software may be, for example, control programs shown in FIGS. 6-8 for processing user interface commands and displaying OSD information in accordance with aspects of the present invention as will be discussed below.

The transport unit 303 is typically implemented as an integrated circuit. For example, a preferred embodiment is an IC manufactured by SGS-Thomson Microelectronics and has a Part No. ST 15273-810 or 15103-65C.

The MPEG compatible, compressed audio and video packets from the transport unit 303 are delivered to a MPEG decoder 304. The MPEG decoder decodes the compressed MPEG datastream from the transport unit 303. The decoder 304 then outputs the applicable audio stream which can be further processed by the audio digital-to-analog converter (DAC) 305 to convert the digital audio data into analog sound. The decoder 304 also outputs applicable digital video data which represents image pixel information to a NTSC encoder 306. The NTSC encoder 306 then further processes this video data into NTSC compatible analog video signal so that video images may be displayed on a regular NTSC television screen. The MPEG decoder as described above may be implemented as an integrated circuit. One exemplary embodiment may be an MPEG decoder IC manufactured by SGS-Thomson Microelectronics having Part No. ST 13520.

Included in the MPEG processor 304 is an OSD processor 320. The OSD processor 320 reads data from SDRAM 316 which contains stored OSD information. OSD information corresponds to bitmap OSD graphics/text images. The OSD processor is capable of varying the color and/or translucency of each pixel of an OSD image under the control of the ARM microprocessor 315 in a conventional manner.

The OSD processor is also responsible for generating an exemplary program guide as shown in FIG. 5 under the control of the ARM processor 315. In the exemplary embodiment, upon detecting a user request to generate a guide display, the ARM microprocessor 315 processes the program guide data information obtained from a data stream provided by a program guide information provider and formats the guide data information into OSD pixel data corresponding to a "grid guide" as shown in FIG. 5. The OSD pixel data from the transport unit 303 is then forwarded to OSD processor 320 in the MPEG audio/video decoder 304 for generating the guide image, as described before.

As shown in FIG. 5, the "grid guide" 500 typically occupies the whole screen of a display. The grid guide 500 shows a program schedule in a time-and-channel format, similar to a TV schedule listed in a newspaper. In particular, one dimension (e.g., horizontal) of the guide shows the time information while the other dimension (e.g., vertical) of the guide shows the channel information. The time information is conveyed to the user by having a time line 501 on the top portion of the guide and is demarked by half hour intervals. The channel information is conveyed to the user by channel numbers 510-516 and corresponding channel station names 520-526.

In addition, the program guide 500 contains icons Internet 550 and Email 560. By clicking on these icons, a user can surf the Internet and send/receive email respectively through the communication interface unit 307. In addition, an Internet web site icon may also be incorporated into a grid of a program guide. For example, by clicking on "ESPN.com" within grid 570, the user will automatically be linked to, for example, an ESPN web site.

A low speed data port 330 is used to connect to an IR-Blaster (not shown) for controlling a VCR for recording a program. As discussed before, an IR blaster is basically a programmable VCR remote control emulator controlled by the satellite receiver shown in FIG. 4. It is positioned in front of a VCR remote sensor of an attached VCR and will transmit commands such as "ON" and "RECORD" under the control of the satellite receiver at the appropriate time, according to the timer screen information entered by the users.

Additional relevant functional blocks of FIG. 4 include modem 307 which corresponds to the communication interface unit 116 shown in FIG. 3 for access to the Internet, for example. Conditional Access Module (CAM) 309, corresponds to the NRSS decryption unit 130 shown in FIG. 3 for providing conditional access information. Wideband data module 310 corresponds to High Speed Data Port 75 shown in FIG. 3 for providing high speed data access to, for example, a HDTV decoder or a computer. A keyboard/IR Receiver module 312 corresponds to Remote Unit interface 120 shown in FIG. 3 for receiving user control commands from a user control unit 314. Digital AV bus module 313 corresponds to I/O port 100 shown in FIG. 3 for connection to an external device such as a DVD player.

Figure 6:
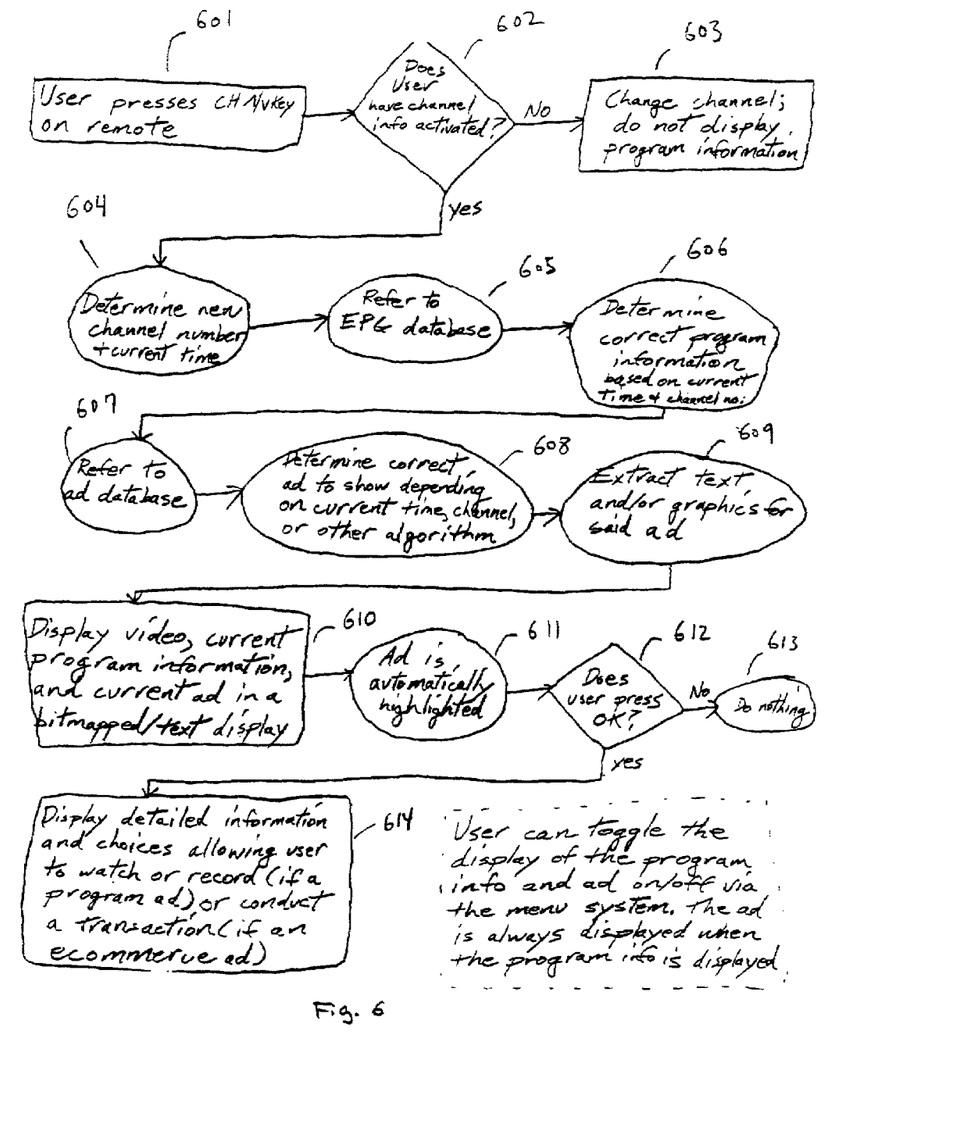
FIG. 6 shows a flowchart, in accordance with the present invention, for processing user commands and displaying exemplary user interface screens in accordance with the present invention.

FIG. 6 is a flow diagram detailing the processing and displaying of advertisements in accordance with the present invention. One skilled in the art will readily recognize that this flow chart can be applied to any of the systems shown in FIGS. 2-4. To eliminate redundancy, the flow chart will be described only in connection with exemplary embodiment of FIG. 4.

In step 601, a user, as usual, presses either a channel up or down key on remote control 314 to channel surf. In step 602, a determination is made by for example, microprocessor 315, to see whether the user has activated channel information OSD display. This channel information display is shown for example, as a channel banner on top of FIG. 1.

Also, in step 604, microprocessor 315 determines what the new channel number is in response to (whether a channel change command has been issued e.g., such as either the channel up or down key being pressed.) The determination is made in connection with what is currently in the channel surfing list or scan list.

A channel surfing list or a scan list is the list of all active video channels accessible when pressing and holding the channel up or down key of a remote control. The concept of an active channel list is not new. The active channel list is simply a collection of channels that the user wishes to cycle through when pressing the channel up or channel down button on the remote. Additionally, any channel in the active channel list can be directly displayed by manually entering the channel number.

In step 606, after the new channel number is determined, microprocessor 315 will query the EPG data to find the correct program information to be displayed. This is based in part on the current time and channel number information determined in step 604. The microprocessor 315 will also query an advertisement database to determine which advertisement to show concurrently with the selected channel. As shown in step 608, the particular ad shown may depend on current time and/or channel, or other algorithm. Other algorithm may include displaying an advertisement according to the type of program shown (e.g., comedy, drama, sports, etc.) or likely viewing demography of the viewers, etc.

In steps 609 and 610, microprocessor 315 will then cause the OSD processor 320 to extract the necessary text and/or graphics information from the ad database. The OSD will display program information, channel video and selected ad at the same time as shown for example, in FIG. 1.

In addition, the displayed ad will be automatically highlighted, as in step 611. Microprocessor 315 will then determine whether the user has selected the ad, for example, by pressing an "OK" key on the remote 314, shown in step 612. In step 614, if the ad has been selected by the user, microprocessor 315 will then cause the display of, for example, detailed information and choices for the ad, for example, allowing the user to watch and/or record video/audio clips of the ad, or to conduct a transaction through modem 307, for example.

Figure 7:
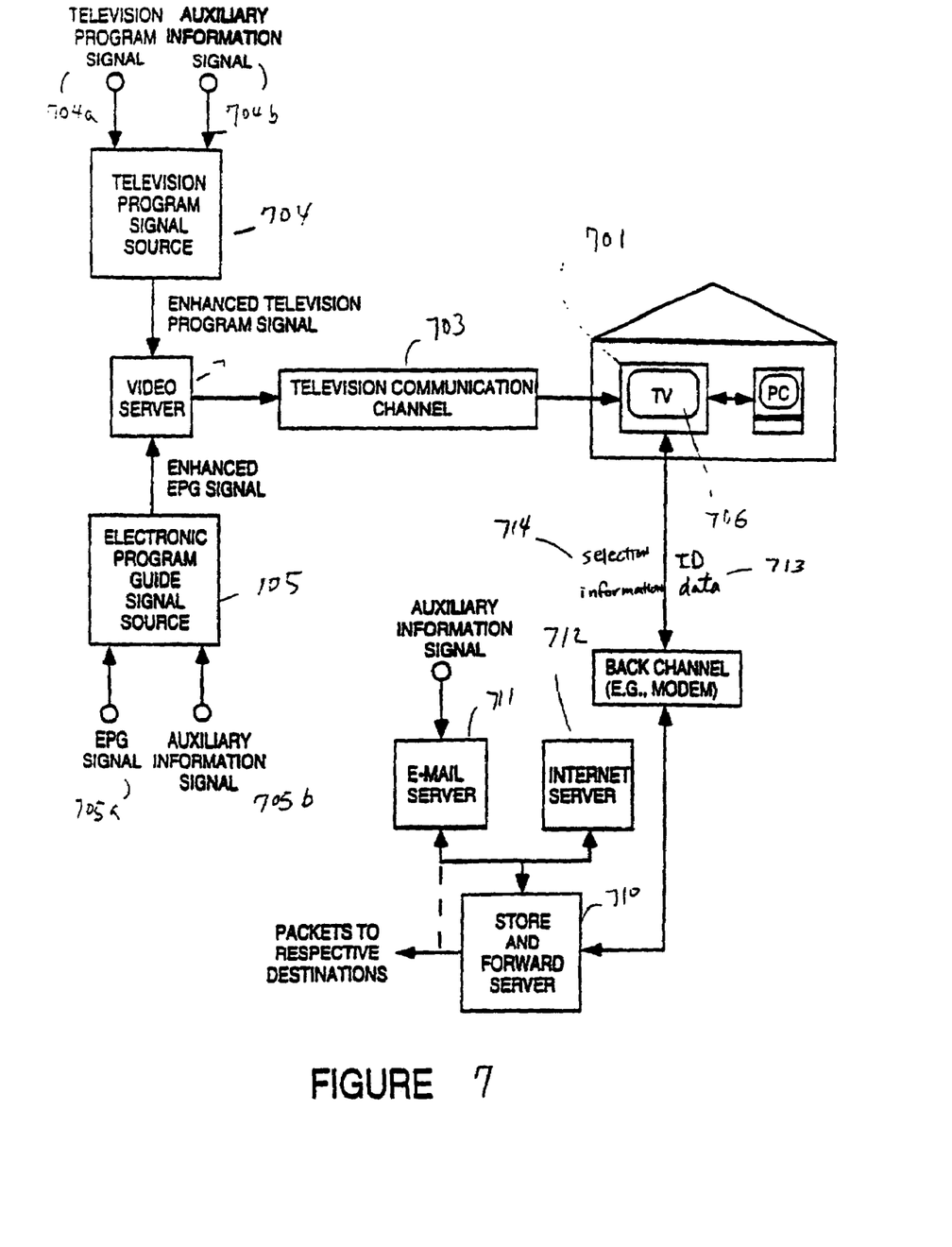
FIG. 7 is another exemplary embodiment of the present invention where advertisement tracking information is generated.
Figure 8:
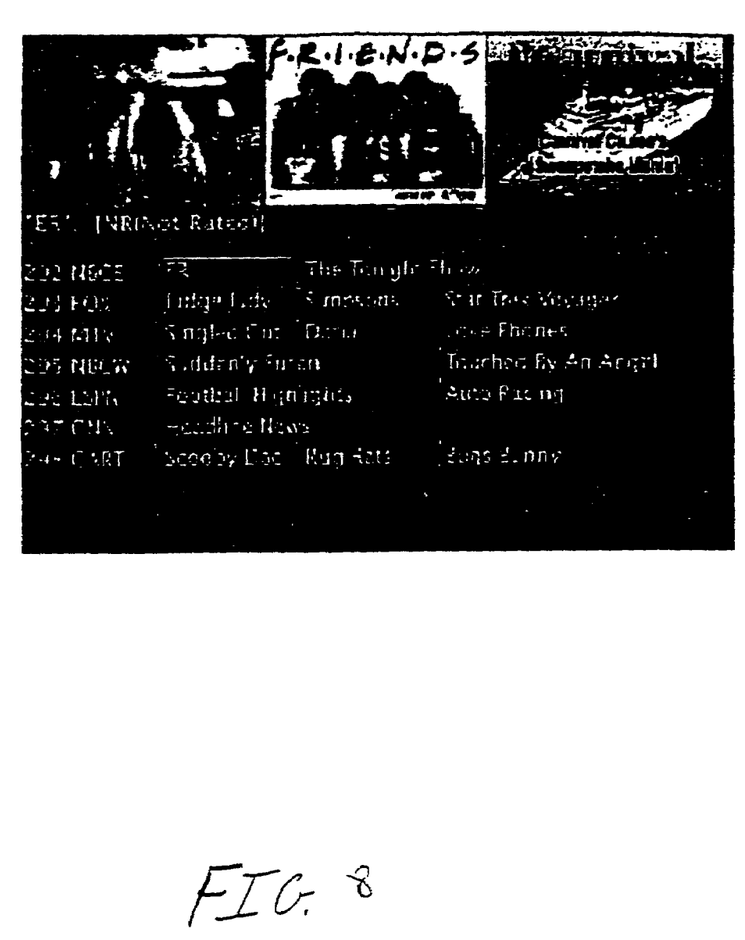
FIG. 8 shows the manner in which auxiliary information may be displayed with the program content associated with a television signal.

Another exemplary embodiment of the present invention is shown in FIG. 7. The system concerns a video processing apparatus 701, which may be implemented as the video apparatus shown in FIG. 4 and described above, capable of communicating television program signals and electronic program guide (EPG) signals each enhanced with auxiliary information, such as advertisements, by a television communication channel 703 such as terrestrial broadcast, cable distribution, satellite broadcast or the like.

Figure 9:
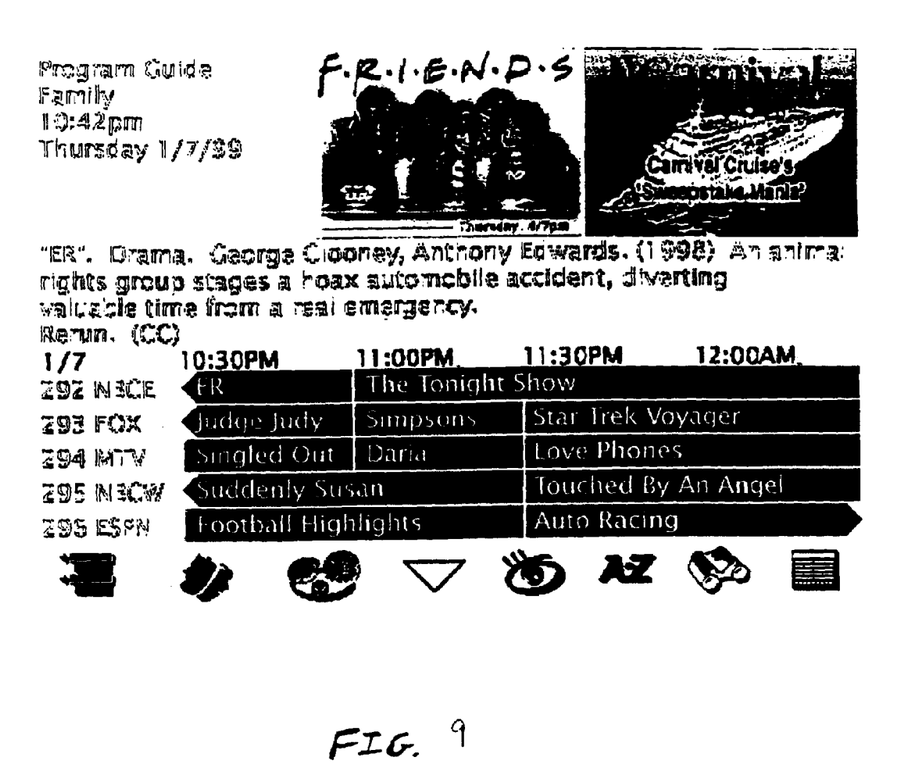
FIG. 9 shows the manner in which auxiliary information may be displayed with an electronic program guide.

The system shown in FIG. 7 receives the enhanced television program and EPG signals via a video server 702, which combines signal sources representing both television program signal source 704 and electronic program guide signal source 705. The television receiver 701 displays the auxiliary information on a monitor 706 connected to the television receiver 701 in association with the displayed video portion corresponding to a selected television program signal and the displayed EPG derived from the EPG signal. FIG. 8 shows the manner in which auxiliary information may be displayed with the program content associated with a television signal; and FIG. 9 shows the manner in which auxiliary information may be displayed with an electronic program guide.

When the auxiliary information such as advertisement is selected by a user via a control system of a television receiver such as a remote control 314 shown in FIG. 4, the system communicates information concerning the selection from the television receiver via a back channel such as a modem 706, to a "store and forward" server 710.

The store and forward server 710 collects and categorizes the selection information 714 from receiver 701 into packages related to the origin of the auxiliary information, and at a later time communicates the selected information back to a designated party, such as the originator of the auxiliary information. The time delay allows for the selection of the transmission times (e.g., at night) to minimize costs. The server 710 also determines the signal source associated with the selected auxiliary information (i.e., the source of the television signal or the EPG signal) and the number of times the auxiliary information has been selected. The number is used by the operator of the server to determine a fee to be paid, e.g., by the originator of the auxiliary information. This information may also be used to selectively determine the type of auxiliary information to be transmitted to or displayed for the user.

The selection information 714 communicated to the store and forward server from a television receiver may include identification data 713 for identifying the television receiver 701 from which the selection information 714 was sent. Such a provision allows the originator of the auxiliary information to identify and communicate with the consumers making the selection for the purposes of providing additional information and making sales. In a related feature, the provision of identifying the television receiver through the back channel may allow an audience survey company to monitor the viewing habits of the consumers.

Various signal formats for embedding the auxiliary information in the television program signals and EPG signals are available. For example, a protocol known as ATVEF proposed by the Advance Television Enhancement Forum, an alliance of television communication and computer companies is advantageous. The protocol is based on the HTML (Hypertext Markup Language) utilized in the Internet. The ATVEF protocol may be used with both analog and digital television systems. Other protocols may be used. In an analog television system, the auxiliary information may be included in the vertical blanking interval (VBI) of the television program signal, together with the EPG signal. In a digital television system the auxiliary information may be "packetized" and inserted into the digital data stream including the television program data and EPG data.

Another tier or feature level of the television system may also include provisions for communicating E-mail information, e.g., via the store and forward sever, also enhanced with auxiliary information, such as advertisements, to television receivers. In that case, the store and forward server also collects and categorizes the selection information associated with e-mail and quantifies the selection information for revenue tracking purposes. In this tier, providing auxiliary information, such as advertisements, subsidizes the cost of the E-mail service and may, in fact, allow for "free-mail". However, since the server delays the transmission of data so as to be economic, still other tiers of the system may provide for accelerated E-mail communication service and possibly also connection to the Internet upon the payment of fees by the consumer. Such an e-mail server 711 and Internet server 712 are shown in FIG. 7.

The auxiliary information may also contain software for operating the television receiver or for providing an additional functionality to it, such as video games or personal computer functions including, e.g., word processing and spread sheet programs. To the extent that the television receiver itself has insufficient data processing capability itself, e.g., insufficient memory, such data processing may be shared from a personal computer linked to the television receiver via a bus.

Another aspect of such an apparatus provides for integrating a web browser and either an Ethernet or HomePNA interface for networking. Connecting the apparatus to a personal computer (PC) enhances the functionality by being able to download software applications, such as a word processor or spreadsheet, from the PC. Further, the apparatus could utilize the PC for data storage or for printing. A network connection would enable storing a URL directly and/or automatically on the PC.

As described previously, manufacturers and service providers are adding advertisements to items such as Electronic Program Guides. However, some users do not use EPGs or use EPGs infrequently. Instead, they "channel surf" by simply holding the channel up or down key of a remote control. Therefore, one aspect of the present invention "inserts" an advertisement (with or without corresponding channel banner description information) into the channel list of the TV.

A channel surfing list is the list of all active video channels accessible when pressing and holding the channel up or down key of a remote control. Thus, when the user "surfs" (channel up or direct channel entry) to the ad page, rather than tuning to a video frequency, the advertisement is presented. This embodiment therefore, provides the capability to insert an advertisement "channel" into this channel list so that the user can view an advertisements. Further, this invention enables the compilation of ad hits as people channel surf. The ad insertion can either be made to specific unmapped (not used by video) channels, or by inserting the advertisement after a certain number of channels have been surfed.

From an implementation standpoint, the active channel list must contain an attribute identifying what the "channel" is. That is, is it tunable video or is it an advertisement. When traversing the active channel list, the consumer device checks the attribute and determines if it needs to tune to the video or take some other action.

For devices that provide channel banner information (a title of the program), a banner for the advertisement will also be generated, such as shown for example, in FIG. 1.

Another aspect of the present invention is that the following electronic content can be inserted into the channel surfing list:

TV Home Page
EPG
Email Application
Internet Connection Page
Local (meaning stored in the TV or consumer product device) Video Advertisements It will be readily apparent to those skilled in the art that the teachings of the present invention described above may be applied to a television, VCR, settop boxes, a video storage and playback unit such as a Tivo, etc., without departing from the true scope of the claims appended hereto.

The invention claimed is:

1. A method for presenting advertisement in a video apparatus having an electronic program guide, comprising the steps of:
   a. determining whether a channel change command has been issued;
   b. determining a new channel from a list of channels in response to the channel change command having been issued;
   c. determining an associated advertisement to be displayed with a new channel;
   d. generating for display a signal comprising a video program received from the new channel, program information from the electronic program guide corresponding to the new channel, and the advertisement associated with the new channel, wherein the method further comprising the steps of:
   e. automatically highlighting the advertisement being displayed so that the user may select the advertisement;
   f. sending back data to a server indicating whether an advertisement has been selected; and
   g. sending back additional data to said server indicating a source of said advertisement wherein said video apparatus receives advertisements to be displayed in said electronic program guide from a plurality of different sources.

2. The method of claim 1 further comprising the step of displaying the step of displaying detailed information about the advertisement when the user selects the advertisement.

3. The method of claim 1 where the step of determining an associated advertisement further comprising the step of determining a current time.

4. The method of claim 1, wherein said plurality of different sources are different signal sources if said advertisement is capable of being received from at least two different signal sources.

5. The method of claim 1, wherein said data transmitted back to said server is used to determine a fee that is to be paid by an advertiser corresponding to a selected advertisement.

* * * * *